J. ROBERTSON.
Animal-Clamping Hook.
No. 217,747.  Patented July 22, 1879.
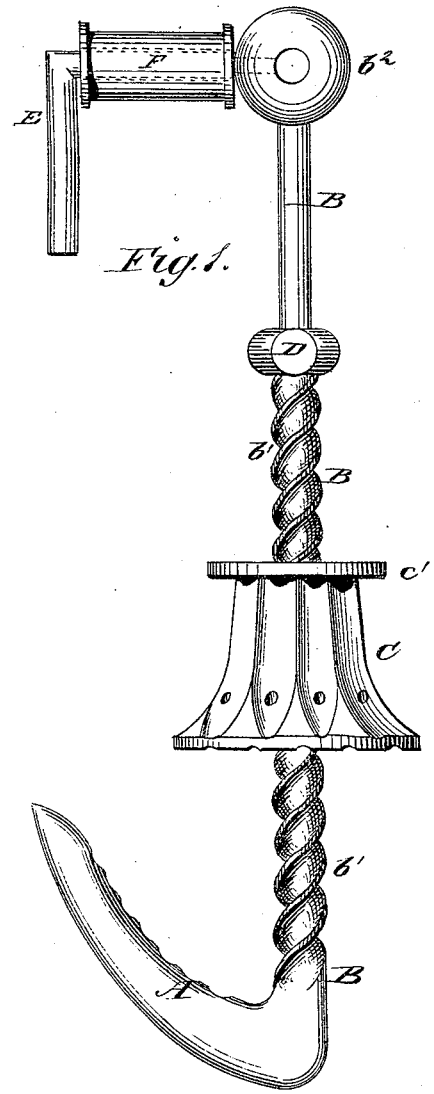
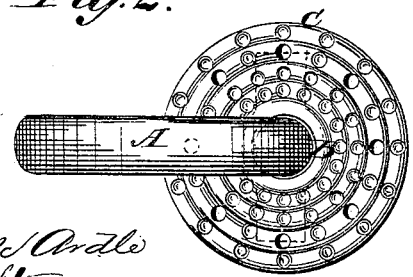
WITNESSES:
Francis McArdle
C. H. Moulton
INVENTOR:
James Robertson

UNITED STATES PATENT OFFICE.

JAMES ROBERTSON, OF EAST CAMBRIDGE, MASSACHUSETTS.

IMPROVEMENT IN ANIMAL-CLAMPING HOOKS.

Specification forming part of Letters Patent No. 217,747, dated July 22, 1879; application filed June 7, 1879.

*To all whom it may concern:*

Be it known that I, JAMES ROBERTSON, of East Cambridge, in the county of Middlesex and State of Massachusetts, have invented a new Improvement in Animal-Clamping Hooks, of which the following is a specification.

Figure 1 is a side view of my improved hook. Fig. 2 is a base view of the same.

Similar letters of reference indicate corresponding parts.

The object of this invention is to furnish an improved hook for securing and controlling animals for slaughter and for other purposes, which shall be simple in construction and convenient and reliable in use, and which shall be so constructed that the struggles of the animal to escape after being secured will only cause the device to hold with more certainty.

The invention consists in a screw-shank provided with a clamping-nut, having a notched hook formed or fitted upon its lower end, having a guarded handle at its upper end, and having a hole through its upper end for securing it to a staff, rope, or chain, and in a screw-shank provided with a clamping-nut, having a notched hook formed or fitted upon its lower end, having a guard attached to it near its upper end, having a hole formed in its upper end for securing it to a staff, rope, or chain, and provided at its upper end or handle with a bent arm having a roller placed upon it, as hereinafter fully described.

A is a hook formed or fitted upon the lower end of a rod or shank, B. The shank B has one or more spiral grooves or threads, $b^1$, formed upon it, and extending from the base of the hook A nearly to the guard of the said shank B.

The screw-thread of the shank B fits into the screw-thread of a nut, C, the lower side of which has an enlarged face, flat, convex, or concave, as may be desired, and is corrugated, indented, or otherwise roughened, to cause it to take a surer hold upon any object against which it may be screwed down. For the same purpose the face of the hook A is corrugated or roughened, as indicated in Fig. 1.

The outer side of the nut C is fluted, squared, or otherwise shaped, so that it may be conveniently turned, and has a flange, $c'$, formed around its upper end, for convenience in unscrewing it when other means than the hand must be used to release a dangerous or dead animal.

A number of holes are formed through the lower part of the nut C, for securing a pad or cushion to its face when desired. The face of the hook A may also be padded or cushioned, if desired.

To the shank or rod B, at the upper end of its screw-thread, is secured a short cross-bar, D, to serve as a guard.

The handle part of the shank or rod B is enlarged to a knob or ball, $b^2$, formed upon or attached to it, to serve as a part of the handle, and which has a hole formed through it to receive a bolt for securing it to a staff or a shackle for connecting it to the end of a rope or chain, for holding, pulling, or hoisting the animal, as may be required.

With this construction, when a limb or other part of an animal has been secured in the hook, any struggle of the animal to free itself will only cause the nut to clamp it more securely until released by unscrewing the clamping-nut; also, in cases which will occur, that the hand may not be used to unscrew the clamp-nut, the guide-flange on the nut affords facility to apply any other handy means to discharge the animal from the clamp-hook.

To the upper end or handle of the shank B is attached a bent arm, E, directly over the hook A, and which has a roller, F, placed upon it, to adapt the hook for carrying the clamped animal along a rail between the workmen with celerity.

Having thus described my invention, I claim as new and desire to secure by Letters Patent—

1. A screw-shank, B, provided with a clamping-nut, C, having a notched hook, A, formed or fitted upon its lower end, having a guard, D, attached to it near its upper end, and having a hole formed in its upper end for securing it to a staff, rope, or chain, substantially as herein shown and described.

2. A screw-shank, B, provided with a clamping-nut, C, having a notched hook, A, formed or fitted upon its lower end, having a guard, D, attached to it near its upper end, having a hole formed in its upper end for securing it to a staff, rope, or chain, and provided at its upper end or handle with a bent arm, E, having a roller, F, placed upon it, substantially as herein shown and described.

JAMES ROBERTSON.

Witnesses:
 JOHN R. FAIRBAIRN,
 C. H. MOULTON.